Sept. 27, 1927.  
J. LEDWINKA  
1,643,743  
AUTOMOBILE BODY AND METHOD OF MAKING SAME  
Filed Jan. 18, 1922  10 Sheets-Sheet 1
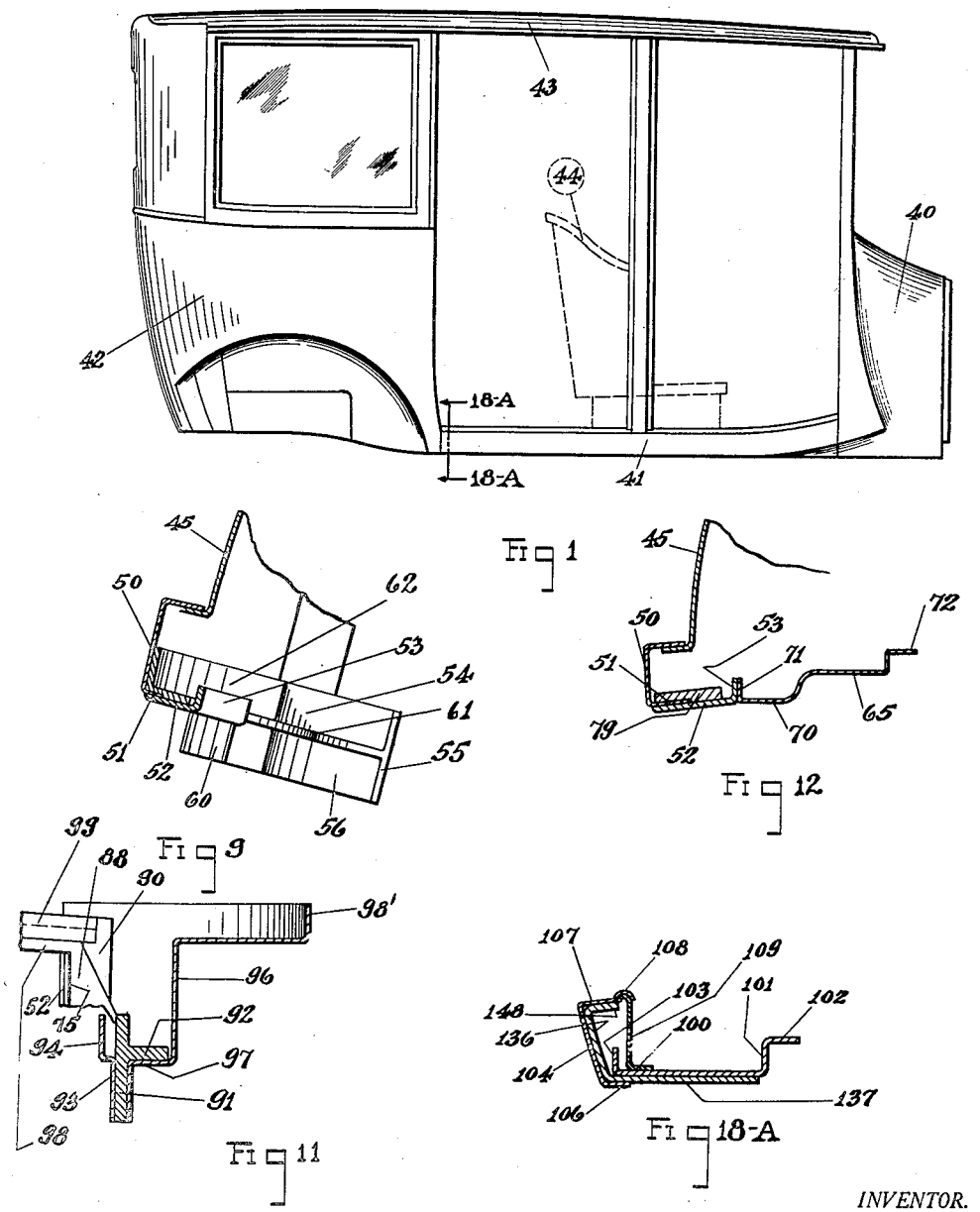
INVENTOR.  
JOSEPH LEDWINKA.  
BY  
ATTORNEY.

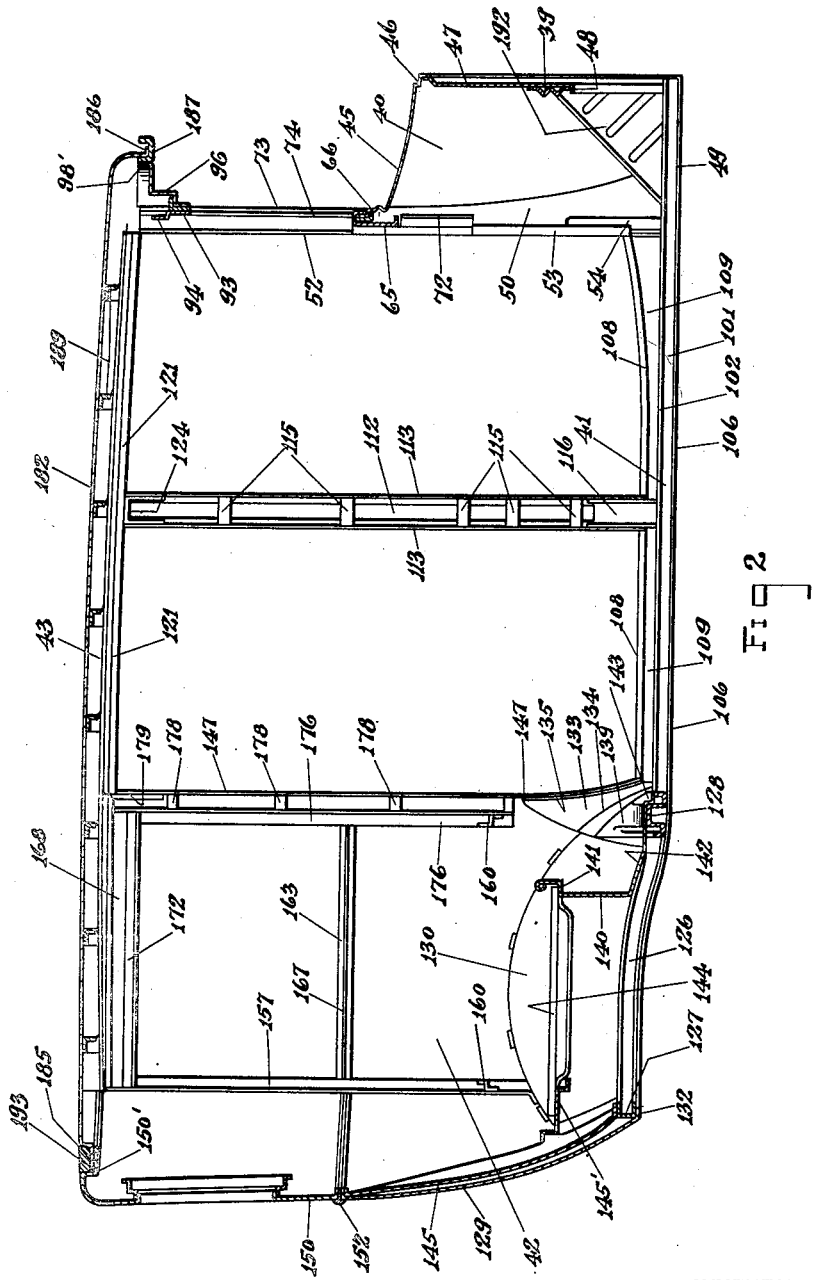

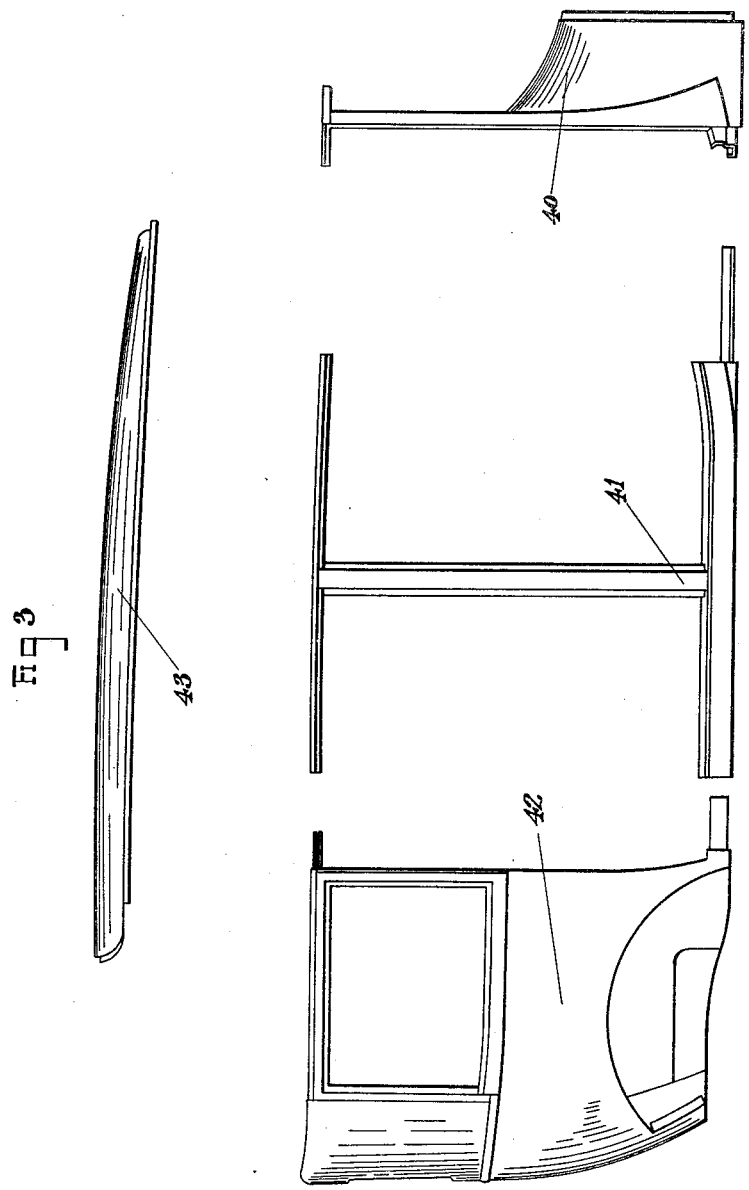

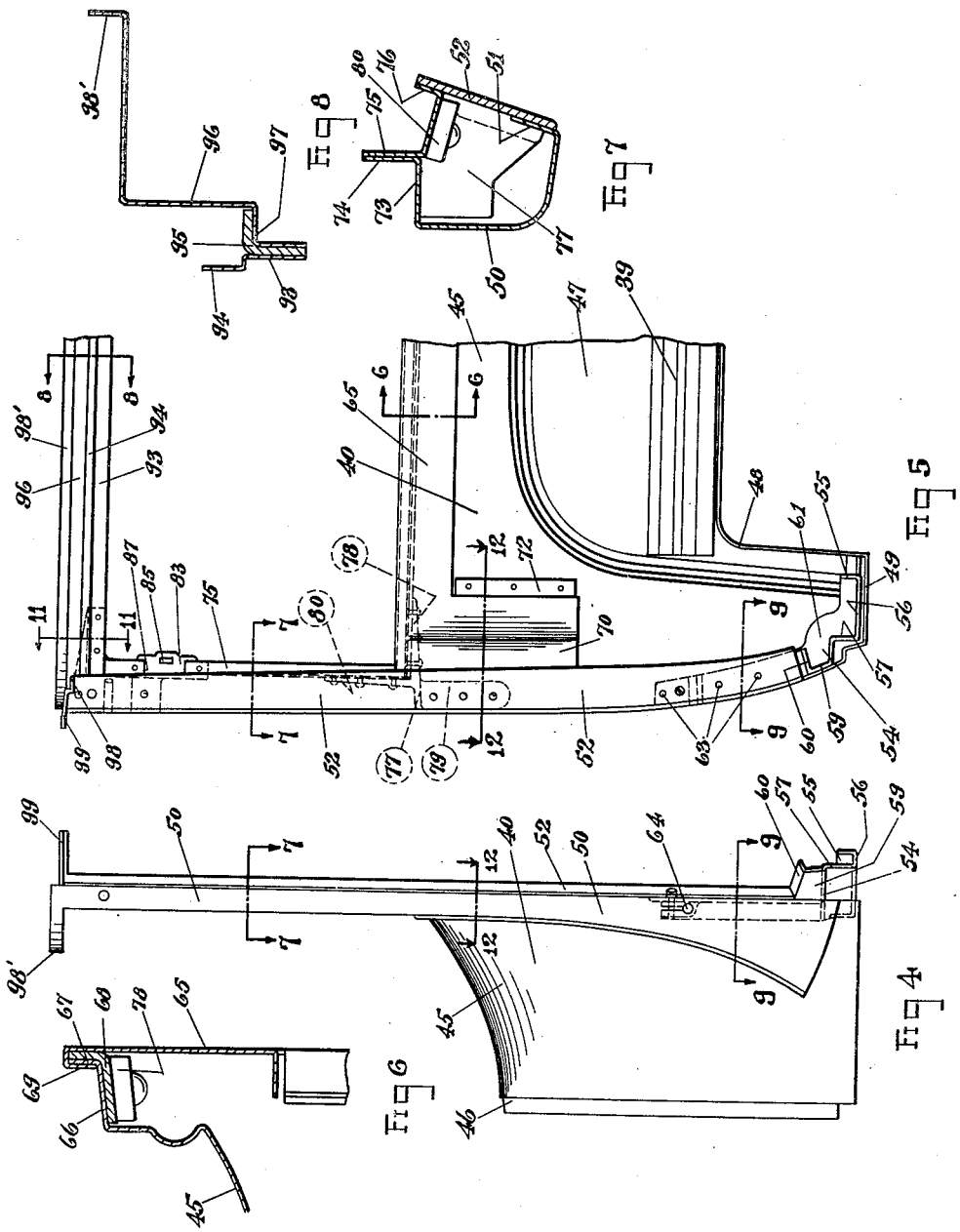

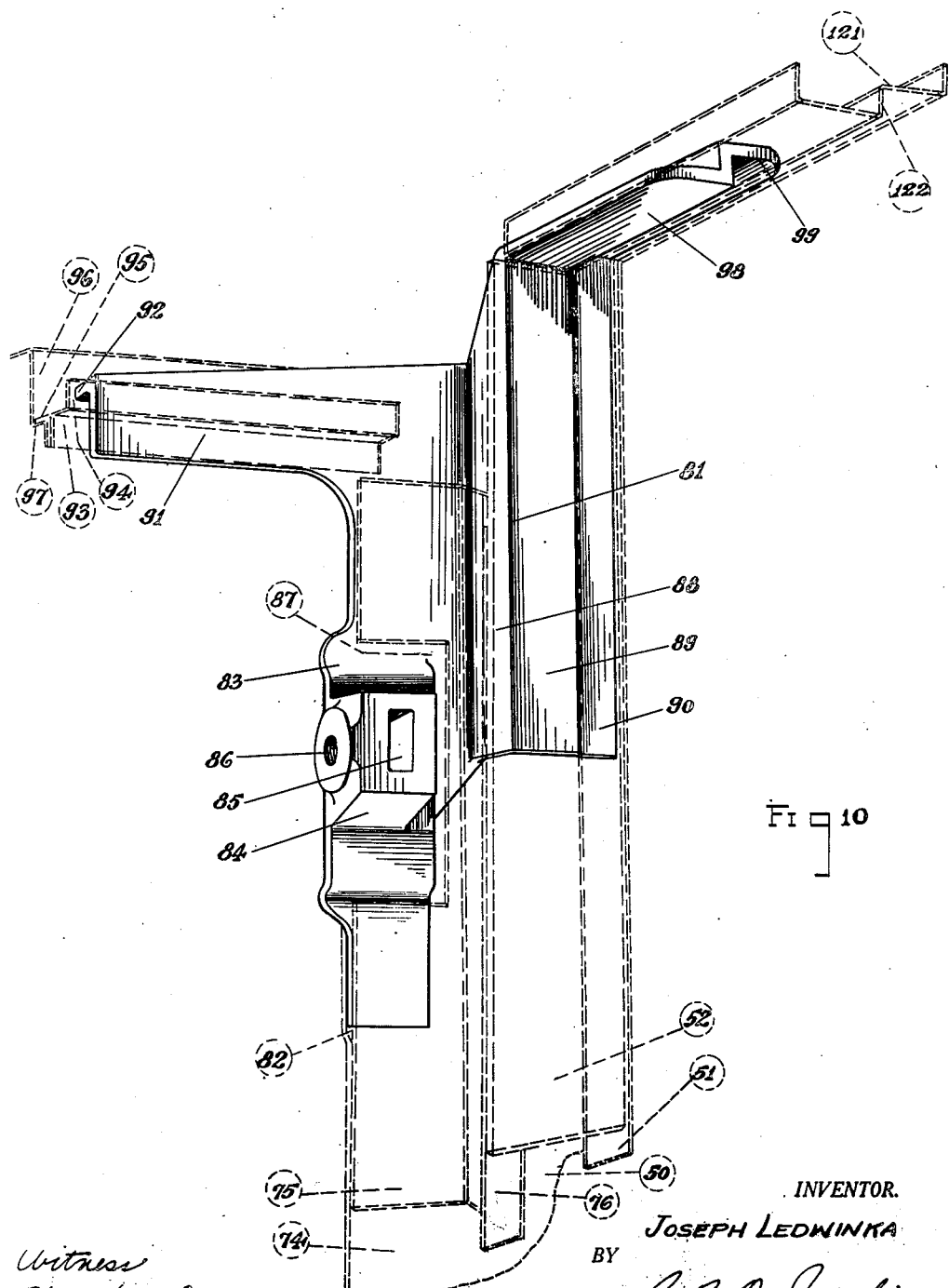

Sept. 27, 1927.  
J. LEDWINKA  
1,643,743  
AUTOMOBILE BODY AND METHOD OF MAKING SAME  
Filed Jan. 18, 1922  
10 Sheets-Sheet 6
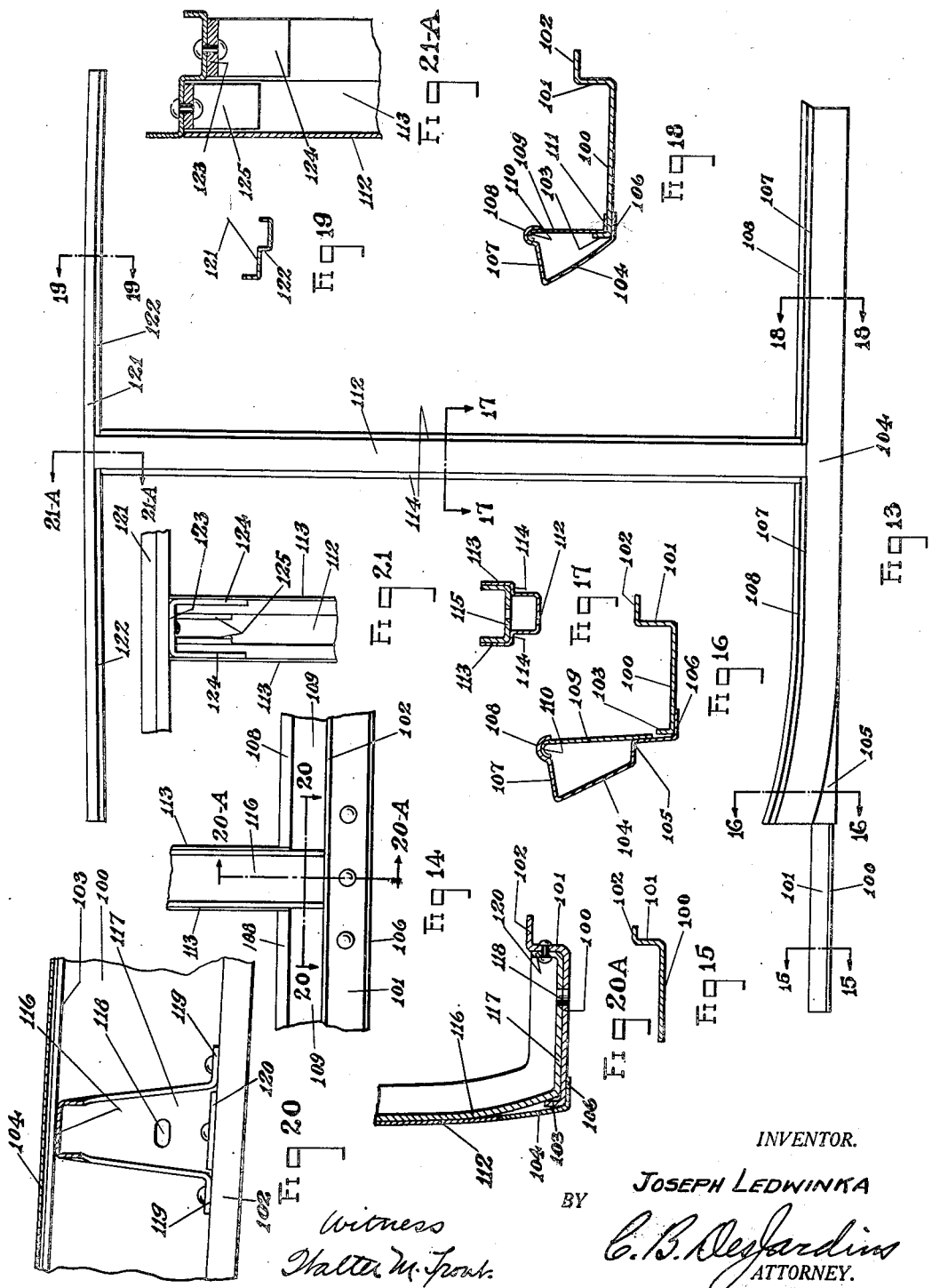
INVENTOR.  
JOSEPH LEDWINKA  
BY  
C. B. Desjardins  
ATTORNEY.
Witness  
Walter M. Spout.

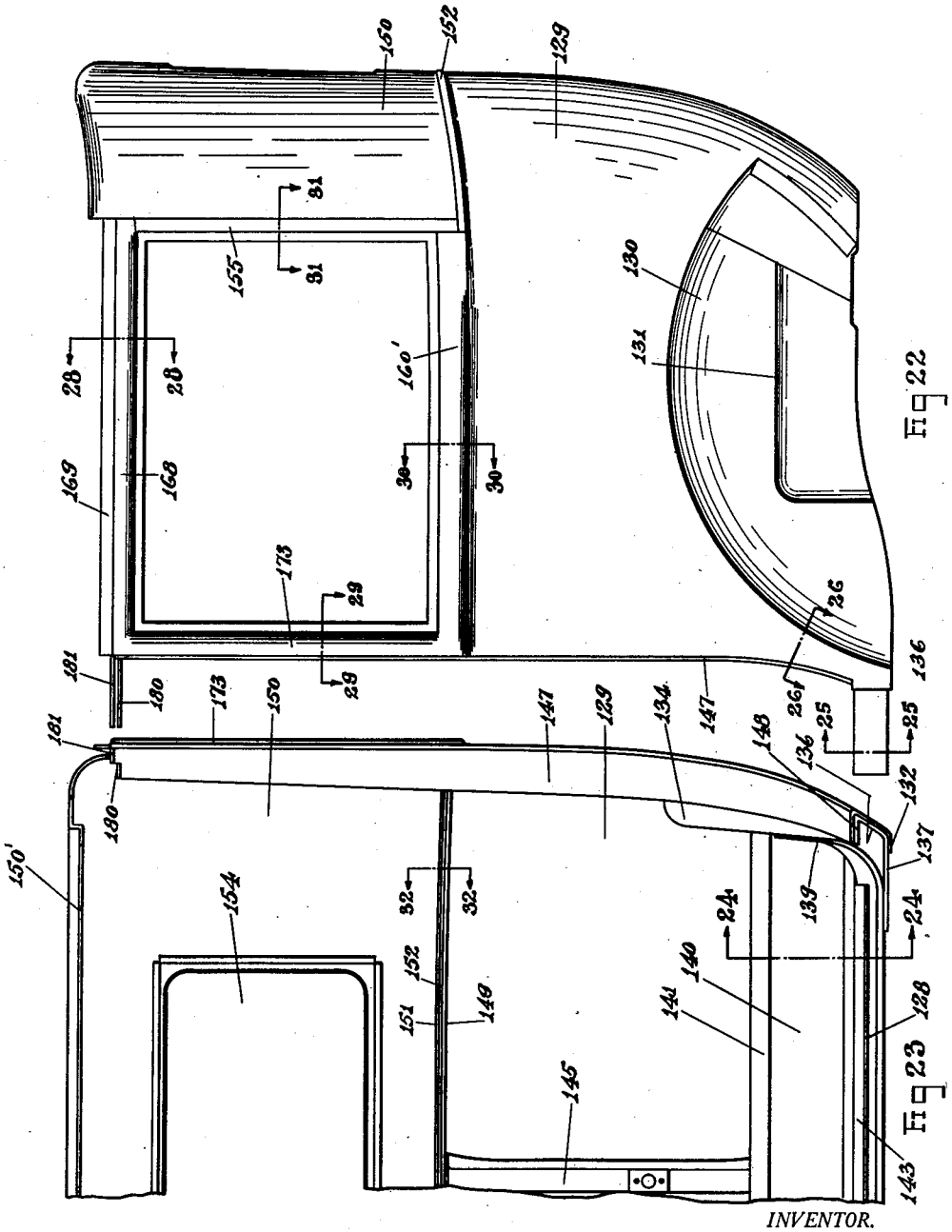

Sept. 27, 1927.  J. LEDWINKA  1,643,743
AUTOMOBILE BODY AND METHOD OF MAKING SAME
Filed Jan. 18, 1922   10 Sheets-Sheet 8

INVENTOR.
JOSEPH LEDWINKA
BY
C. B. DesJardins
ATTORNEY.

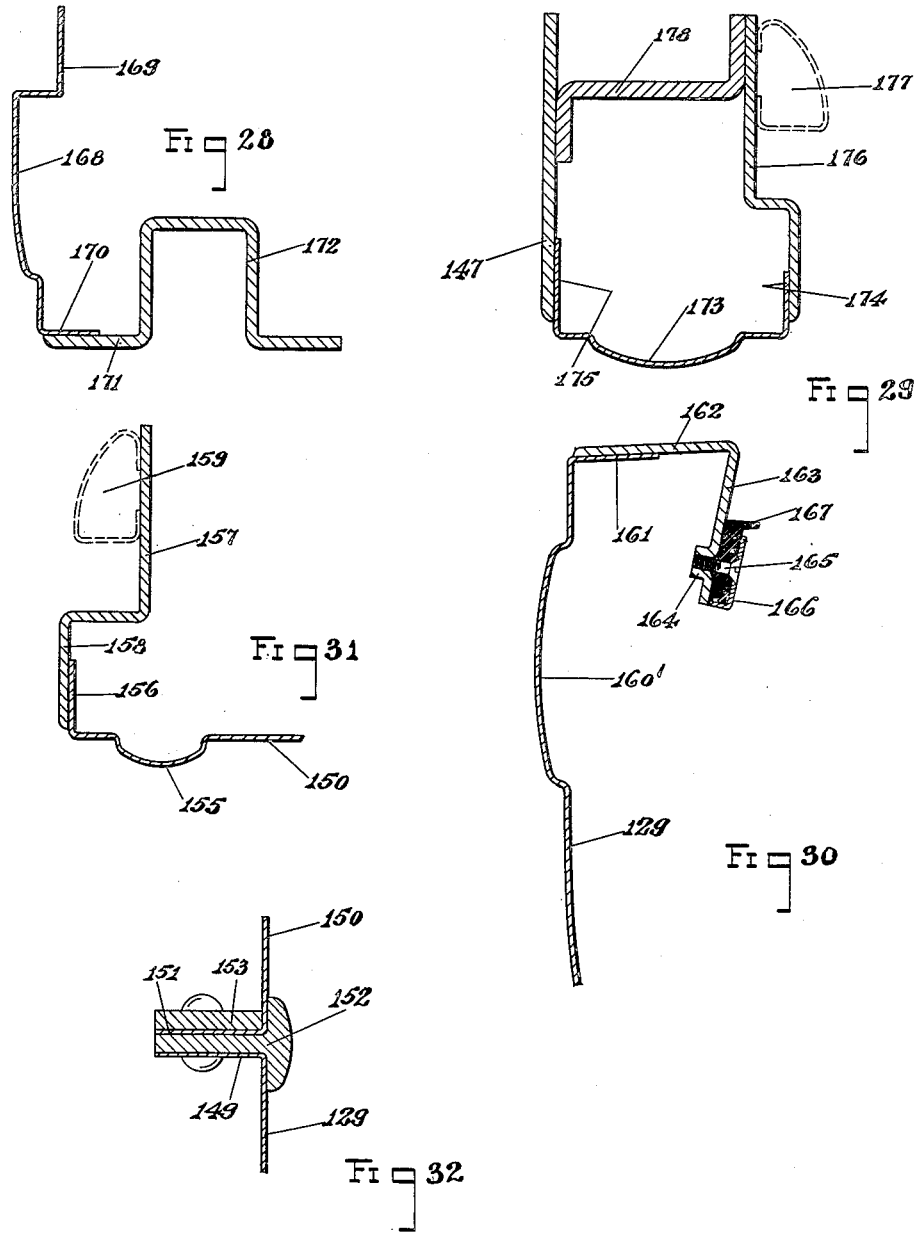

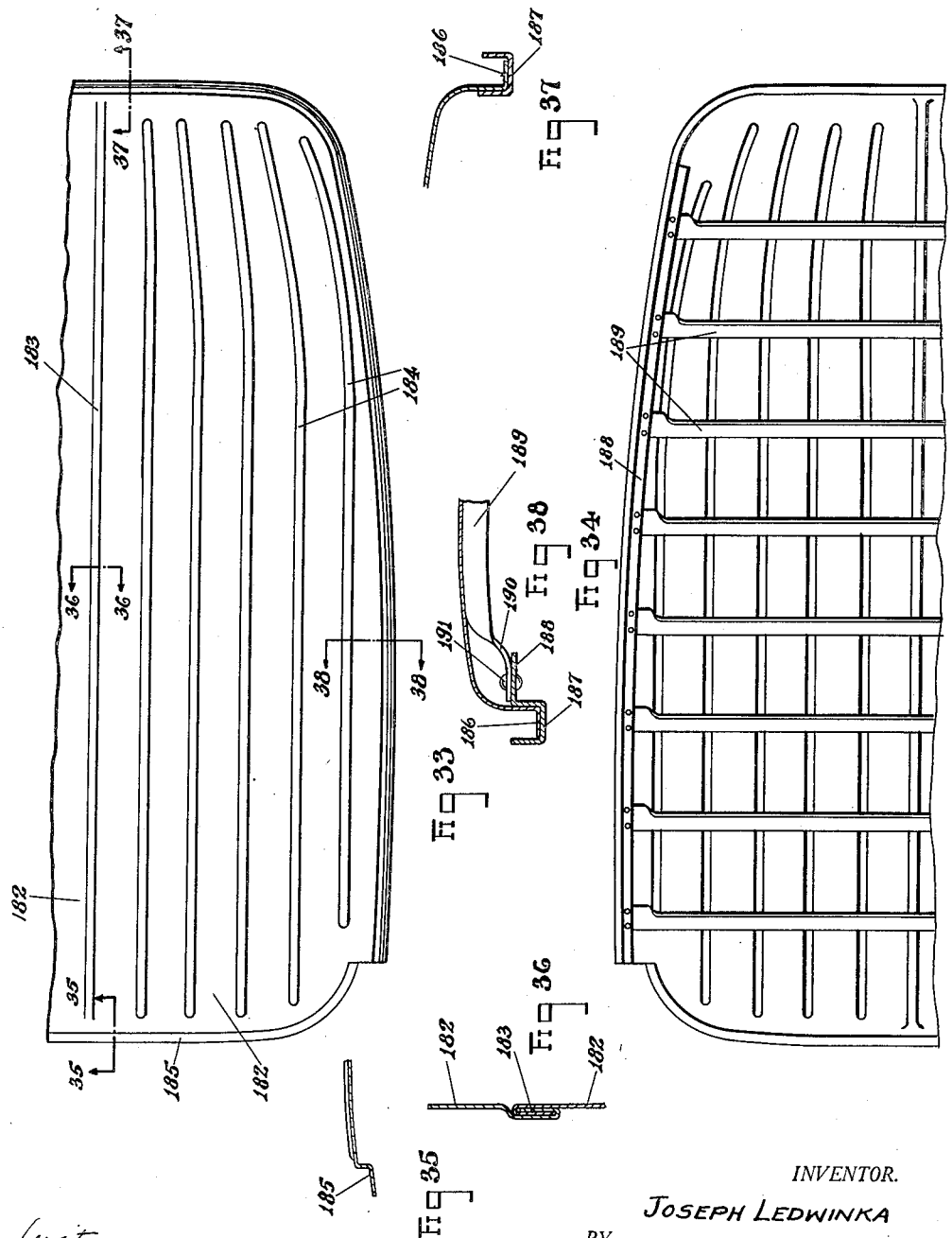

Patented Sept. 27, 1927.

1,643,743

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY AND METHOD OF MAKING SAME.

Application filed January 18, 1922. Serial No. 530,114.

My invention relates to improvements in automobile bodies and the method of making same and has to do, primarily, with automobile bodies of the "closed" type constructed entirely from metal, so that all wooden parts are eliminated from the body proper.

One of the objects of my present invention is to provide a "closed" automobile body of strong and durable construction, which may be produced very efficiently in large quantities.

Another object of my present invention is to provide a "closed" automobile body made up of a number of assembly units, or sub-assemblies, suitably connected together in the final assembly to form the complete body.

A further object of my present invention is to provide a novel tonneau unit particularly adapted for the construction of "closed" bodies.

A further object of my present invention is to provide a novel cowl unit for "closed" bodies, provided with suitable means for supporting a windshield closing the front end of the body.

A further object of my present invention is to provide a novel roof unit for "closed" bodies, which is made entirely of metal, and reinforced and braced so as to form a self-sustaining unit, supported from the other units of the body.

A further object of my present invention is to provide a novel side unit forming the side of the body and the central door post and provided with means for supporting the roof unit.

A further object of my present invention is to construct an automobile body of the "closed" type (such as a sedan body) by the assembly of a number of body units to form the complete body.

Another object of my present invention is to provide an improved method of constructing sheet metal automobile bodies of the "closed" type, consisting in forming various body units, or sub-assemblies, and then connecting such units or sub-assemblies to form the complete body.

Further objects, and objects relating to details and economies of construction and operation, will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view in side elevation of a body constructed in accordance with my invention, the front seats being shown in dotted lines and the doors being omitted.

Fig. 2 is a longitudinal, vertical, sectional view through the body.

Fig. 3 is a view showing, in side elevation, the various units going to make up the body, these units being grouped in accordance with their positions in the body.

Fig. 4 is a view of the cowl unit in side elevation.

Fig. 5 is a view of the cowl unit in rear elevation, one half of this unit being shown broken away.

Fig. 6 is a sectional view through the rear, upper edge of the cowl panel, taken on the line 6—6 of Fig. 5.

Fig. 7 is a sectional view through the front door post, taken on the line 7—7 of Figs. 4 and 5.

Fig. 8 is a view through the top rail of the cowl unit, taken on line 8—8 of Fig. 5.

Fig. 9 is a view through the lower portion of the front door post, taken on the line 9—9 of Figs. 4 and 5.

Fig. 10 is a perspective view of one of the brackets at the upper ends of the front door posts, the parts of the unit attached to such bracket being shown in dotted lines.

Fig. 11 is a detail view through the top rail of the cowl unit, taken on the line 11—11 of Fig. 5.

Fig. 12 is a sectional view through the front door post and the instrument board support, taken on the line 12—12 of Figs. 4 and 5.

Fig. 13 is a view of one of the side units in side elevation.

Fig. 14 is a fragmentary view of a portion of the same, taken in side elevation, looking at the inner side of the unit and at the lower end of the central door post.

Fig. 15 is a sectional view through the front end of the body sill, taken on line 15—15 of Fig. 13.

Fig. 16 is a sectional view through the side unit, taken on the line 16—16 of Fig. 13.

Fig. 17 is a sectional view through the central door post, taken on line 17—17 of Fig. 13.

Fig. 18 is a sectional view through the side unit, taken on line 18—18 of Fig. 13.

Fig. 18^A is a sectional view taken on the line 18^A—18^A of Fig. 1, showing the connection between the side and tonneau unit.

Fig. 19 is a sectional view through the top rail of the side unit, taken on the line 19—19 of Fig. 13.

Fig. 20 is a detail, sectional view, taken on line 20—20 of Fig. 14.

Fig. 20^A is a detail, sectional view, taken on line 20^A—20^A of Fig. 14.

Fig. 21 is a fragmentary view in side elevation, looking at the inside of the upper portion of the central door post.

Fig. 21^A is a detail, sectional view, taken on line 21^A—21^A of Fig. 13.

Fig. 22 is a view of the tonneau unit in side elevation.

Fig. 23 is a view in front elevation of the right-hand portion of said unit.

Figure 24:
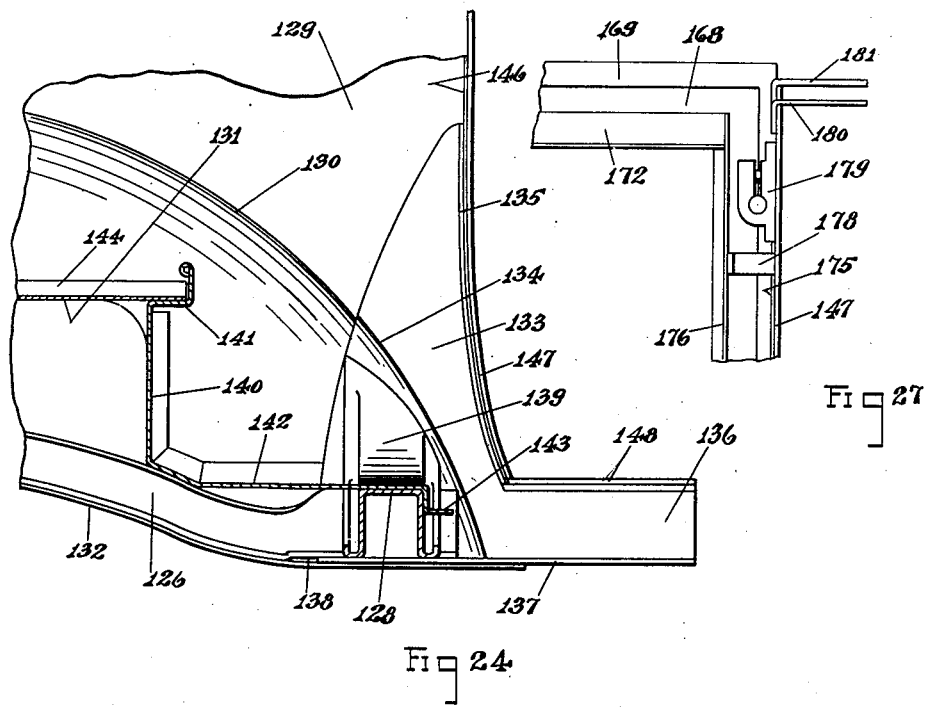

Fig. 24 is a fragmentary, sectional view, taken on line 24—24 of Fig. 23 and showing the lower, forward corner of the tonneau unit.

Figures 25, 26:
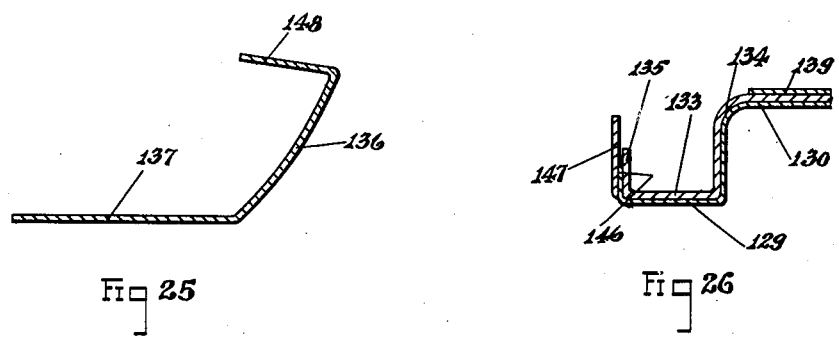

Fig. 25 is a detail, sectional view, taken on line 25—25 of Fig. 22.

Fig. 26 is a sectional view through a portion of the tonneau unit, taken on line 26—26 of Fig. 22.

Fig. 27 is a view in side elevation, looking at the inner side of the upper, forward, corner portion of the tonneau unit.

Fig. 28 is a detail, sectional view through the upper rail of the tonneau unit, taken on line 28—28 of Fig. 22.

Fig. 29 is a detail, sectional view through the rear door post, taken on line 29—29 of Fig. 22.

Fig. 30 is a detail, sectional view through the tonneau unit, at the lower edge of the side window opening, taken on line 30—30 of Fig. 22.

Fig. 31 is a detail, sectional view taken on line 31—31 of Fig. 22, showing the construction at the rear edge of the side window opening.

Fig. 32 is a detail, sectional view, taken on the line 32—32 of Fig. 23.

Fig. 33 is a top plan view of one half of the roof unit.

Fig. 34 is a fragmentary, bottom plan view thereof.

Fig. 35 is a detail, sectional view through the rear end of the roof unit, taken on line 35—35 of Fig. 33.

Fig. 36 is a detail, sectional view, taken on line 36—36 of Fig. 33, showing the connection between the two panels forming the roof unit.

Fig. 37 is a section at the forward end of the roof unit, taken on the line 37—37 of Fig. 33, and Fig. 38 is a detail, sectional view through the side of the roof unit, taken on the line 38—38 of Fig. 33.

In the drawings, the same reference numerals refer to the same parts throughout the several views, and the sectional views are taken looking in the direction of the arrows at the ends of the section lines.

In general, I attain the objects of my invention by providing a skeleton frame, which may be made up of pressed metal stampings, which takes the stresses and strains coming on the body in use and transmits them to the chassis frame of the automobile, and a shell to give external appearance to the body and made up of sheet metal panels pressed to the desired shape and contour and rigidly secured to the skeleton frame. The skeleton frame may include longitudinally extending body sills, connected by cross-members at suitable points, and door posts extending upwardly from the body sills. The shell may include cowl, side and tonneau panels, a roof panel covering the top of the body and a rear panel between the upper edge of the tonneau panel and the roof panel. The "closed" body described in this application, therefore embodies the invention disclosed and claimed in Letters Patent, No. 1,143,635, June 22nd, 1915.

My present invention is an improvement upon the body constructions disclosed and claimed in my pending applications, Serial No. 336,058, filed November 6, 1919, entitled—"Closed body structures for automobiles"—, and Serial No. 504,927, filed October 3, 1921, entitled—"Automobile bodies", to which applications cross-reference is made hereby.

In this application, I have illustrated a "closed" body of the sedan type, but it is to be understood that my invention is not to be restricted to the sedan type of body and may be embodied in other "closed" bodies, such as those of the coupé or limousine type. Many of the features of construction illustrated here in connection with a sedan body may be utilized in connection with other types of "closed" bodies.

In general, I carry out the objects of my invention by providing a "closed" body constructed entirely of metal and made up of a series of units which are independently fabricated and joined together in the final assembly so as to make the complete body. This permits of the manufacture of these independent body units and the shipping of them to the automobile factory, where they may be very quickly and easily assembled to form the complete automobile body. This results in a considerable saving in freight and it also has decided advantages from the production standpoint, since the independently fabricated body units require considerably less floor space for their manufacture or storage than the completed body.

I construct a closed automobile body from a series of body units, for instance, a cowl unit, a tonneau unit, side units and a roof unit, which are rigidly connected in the final assembly to form the complete body. The cowl unit comprises that part of the body in front of the front door openings and usually includes front door posts extending upwardly in position to be connected to and support the forward end of the roof unit. The tonneau unit comprises that portion of the body in the rear of the rear door openings and usually includes a rear panel extending upwardly to support the rear portion of the roof unit. Those portions of the body between and beneath the door openings may be formed by side units connected to the cowl and tonneau units and such side units usually include a central door post which may be rigidly connected to and help to support the roof unit. In certain cases, for instance in constructing a closed body of the coupé type, these side units will be unnecessary and will be eliminated. The roof unit includes a roof panel covering the body and is supported by the various units which we have briefly described.

In accordance with the method of making closed automobile bodies which I have invented, I manufacture these various units above-referred to and form the complete body by connecting them together, for example, by connecting the cowl unit to the forward ends of the side units, the tonneau unit to the rear ends of the side units, and the roof unit to the side units and the upper portions of the cowl and tonneau units, respectively. The various units may be provided with portions which are adapted to extend in overlapping engagement with portions of the other units, whereby the connections between the units may be very quickly and readily effected.

I have illustrated, in the drawings accompanying this specification, a sedan body, which constitutes a typical embodiment of my invention, and a reference to this will serve to make my invention perfectly clear. Referring to the numbered parts of the drawing, I have shown a sedan body made up of the cowl unit, 40, the side units, 41, the tonneau unit, 42, and the roof unit, 43. In Fig. 1, the front seats, 44, are shown in dotted lines, but these front seats do not form a part of the body proper, since they are constructed independently and simply mounted in the completed body. In Fig. 3, the various body units are shown in separated relation and this view will make clear the manner in which they are connected in forming the complete body.

Figs. 4 to 12, inclusive, show the construction of the cowl unit, 40. This unit comprises, in general, a cowl panel which is arched to form that part of the body shell in front of the front doors, and vertically-extending, front door-posts extending considerably above the upper edge of the cowl panel. The upper ends of these door posts may be connected by a top rail. The portion of the cowl panel at the rear, upper edge thereof may be reinforced and, together with the top rail and the upper portions of the front door-posts, form a frame for supporting the sections of the windshield which closes the front of the body. The joints between the upper ends of the door posts and the top rail may be reinforced by suitable brackets to which the side units may be fastened. Similarly, brackets may be provided at the lower ends of the front door posts to which the front ends of the body sills, forming part of the side units, are connected.

The cowl unit, in the body illustrated, is made up of the sheet metal cowl panel, 45, which is pressed into arch form, to form the part of the body shell in front of the front door openings, and has a ledge, 46, pressed in its forward edge portion, forming a seat to receive the rear edge of the engine hood. A shroud pan, 47, is connected rigidly to the forward edge of the cowl panel, 45, and the inner edge of this shroud pan may be flanged, at 48, in order to reinforce it and stiffen it. A toe-board supporting ledge, 39, is fastened to the shroud pan, 47. The lower side portions of the cowl panel, 45, are bent inwardly forming the laterally-extending flange, 49, to which the forward ends of the body sills are secured in the completed body. To each rear side portion of the cowl panel, 45, there is secured a pressed-metal cap member, 50, forming a part of the door post structure. This pressed-metal cap member, 50, is shaped as shown in Figs. 7, 9 and 12, and provided with an inturned flange, 51, to which the vertically-extending strip, 52, of the door post structure is secured, by welding or otherwise. The lower portion of this strip, 52, is provided with a laterally-extending flange, 53, as shown in Figs. 9 and 12. Of course, one of these door post structures is provided at each side of the cowl unit. A bracket, 54, is rigidly connected to the lower end of each front door post and affords a means for connecting the cowl unit to the forward ends of the sills projecting from the side units. Each bracket, 54, has a vertical flange, 55, at its inner edge and a horizontal portion, 56, which is spaced from the flange, 49, of the cowl panel, 45, so as to permit the forward end of the body sill to be inserted and fit snugly between these two parts. The bracket is offset upwardly, at 57, and then inclined outwardly, at 59, to correspond with the curvature of the side of the body, and it is provided with an upper, inwardly-inclined flange, 60, which is adapted to be inserted beneath and to reinforce that part of the side panel on the side unit, which forms the threshold for the door opening. The bracket is stiffened by the vertical rib, 61, which is continued upwardly and forms part of an angle member, 62, which lies against the inner faces of the flange, 51, and strip, 52, of the door post, and is secured thereto by the rivets, 63, so as to reinforce and strengthen the lower portion of the front door post. The upper end of this angle portion, 62, carries, inside the door post structure, a split bracket, 64, for clamping the pin of the lower hinge for the door.

A supporting panel, 65, for the instrument board is secured to the rear upper portion of the cowl unit. The rear, upper portion of the cowl panel, 45, is flanged rearwardly to form the horizontal flange, 66, extending across from one door post to the other, and this horizontal flange terminates in the vertical flange, 67, at its rear edge, (see Fig. 6). This portion of the cowl panel is reinforced by an angle bar, 68, which is secured thereto and extends across from one door post to the other. The upper edge portion of the instrument board support, 65, is flanged, at 69, over the vertical web of the angle bar, 68, and the vertical flange, 67, of the cowl panel, these parts being all rigidly secured together, for instance, by suitable welds. The end portions of the instrument board support, 65, are offset rearwardly, at 70, and provided with a forwardly-extending flange, 71, which lies against and is rigidly secured, by welding or otherwise, to the flange, 53, of the door post reinforcing strip, 52. The panel, 65, is cut away to form a recess in which the instrument board (not shown) fits, and the panel, 65, at the ends of this recess, is provided with the offset flanges, 72, which lie behind the instrument board and to which it may be secured detachably.

That portion of the door post above the instrument board support is formed as shown in Fig. 7. The cap member, 50, above the cowl panel, 45, is flanged rearwardly, at 73, and then laterally, at 74, forming a seat to receive the sides of the windshield sections (not shown). This flange portion, 74, is reinforced and strengthened by a channel member having one flange, 75, lying against and welded to the flange, 74, and another flange, 76, lying against and welded to the strip, 52. This channel may be used to receive a wooden finishing or tacking strip, if desired. The cowl unit is reinforced, at the lower corners of the windshield opening, by three-cornered brackets, 77, each of which has a horizontally-extending leg, 78, which extends along the lower surface of the angle bar, 68, and is riveted thereto, as shown in Figs. 5 and 6, a downwardly-extending leg, 79, which extends along the inner surfaces of and is riveted to the strip, 52, and flange, 51, of the door post, as shown in Figs. 5 and 12, and a vertically-extending leg, 80, which is riveted to the inner surface of the channel member, having the flanges, 75 and 76, as shown in Figs. 5 and 7.

A bracket member, 81, is secured to the upper end of each front door post. This bracket, 81, has a downwardly-extending flange, 83, which lies between the upper ends of the flanges, 74 and 75, of the door post structure, said flanges being offset slightly from each other, forming a recess, 82, to receive this flange, see Fig. 10. The flanges, 75 and 74, are also cut away or notched, as at 87, to accommodate a boss, 84, projecting rearwardly from the flange. 83, of the bracket. This boss is provided with a slot, 85, in which the windshield-adjusting segment works, being controlled by a thumb screw threaded in the opening, 86, in the manner well known in the windshield art. The bracket is offset rearwardly from one edge of the flange, 83, as indicated at 88, and then extends laterally, forming the flange, 89, and the offset flange, 90, said flanges, 89 and 90, lying, respectively, against the inner surfaces of the strip, 52, and the flange, 51, of the door post structure and being rigidly secured thereto by riveting or otherwise. The upper portion of the flange, 83, is continued laterally at 91, and the flange, 91, is provided with a horizontal rib or flange, 92. The peak panel, 96, which is connected to the forward portion of the roof unit, has a rearwardly offset shoulder, 97, which lies against the lower surface of the rib, 92, and is rigidly secured thereto, for instance, by riveting. The peak panel, 96, extends from the upper end of one door post to the other and terminates in a vertical, curved flange, 98', which conforms to the shape given the forward end of the roof. An angle bar, 95, is fitted between in transverse alignment with the inner ends of the flanges, 91, of the respective brackets, and secured to the shoulder, 97, of the peak panel, 96. A Z-shaped, finishing strip has a flange, 93, secured to the rear surfaces of the flanges, 91, of the respective brackets, and the angle strip, 95. This finishing strip is offset to form the upper, vertically-extending flange, 94, providing, in connection with the peak panel, 96, a channel which may be utilized to receive a tacking strip for the upholstering for the roof. The bracket, 81, is also provided with a rearwardly-extending flange, 98, which extends at right angles to the flange, 89, and the offset flange, 99, which extends at right angles to the flange, 90. These flanges are adapted to be rigidly connected to parts of the side unit, as will be described presently. The bracket, 81, may also carry a clamp (not shown) for securing the pin for the upper hinge for the front door.

Each of the two side units may include a body sill, a side panel and a central door post, to which may be added a suitable construction for the support of the roof unit. These side units, one at each side of the body, not only serve to tie the tonneau and cowl units together, but they also provide the skeleton frame for the mid-portion of the body, and that portion of the body shell between the cowl and tonneau units.

Figs. 13 to 21$^A$, inclusive, illustrate the construction of one of the side units, in this case a left-hand side unit for the sedan body, and it will be understood that the right-hand unit is of similar construction except that the parts are reversed so as to fit on the right side of the car. In each side unit, there is included a body sill, 100, provided at its inner edge with the vertical flange, 101, terminating in a horizontal ledge, 102, on which the floor boards may rest. The flange, 101, is longitudinally straight, from end to end, forming a girder portion at the inner edge of the body sill. The outer edge of the body sill is provided with a vertical flange, 103, which is curved longitudinally to conform to the curvature of the lower portion of the body. This sill construction is particularly described and claimed in my pending application for motor vehicles, Serial No. 436,630, filed Jan. 11th, 1921. The straight sill construction is also described and claimed in my pending application for sheet metal body structures for automobiles, Serial No. 290,787, filed April 17, 1919, and in my pending application for motor vehicles, Serial No. 431,732, filed Dec. 18, 1920. To the body sill, 100, there is secured a side panel, 104, which forms that part of the body shell beneath the door openings and is curved vertically, as well as horizontally, as desired, to conform to the curvature of the body. The forward portion of this side panel is pressed inwardly, at 105, see Figs. 13 and 16, to form a shoulder continuing the line of the lower portion of the cap member, 50, of the cowl unit. The side panel, 104, is provided with an inwardly-directed flange, 106, which lies under and is rigidly secured by welding or otherwise to the outer edge portion of the body sill, 100. It will be noted from Fig. 13 of the drawings, that the body sill, 100, projects beyond the front end of the side panel, 104, and that this projecting portion of the body sill does not have the outer flange, 103. (See Fig. 15). The side units are connected to the cowl unit through these projecting portions of the body sills, as will be described later in this specification. At the door openings, the side panel is provided with the inwardly-directed flanges, 107, in which are formed half-round beads, 108, constituting door stops and stiffening the structure so that it is unnecessary to add a separate threshold strip at the door opening, as has been the practice heretofore. (See Figs. 16, 18 and 18$^A$.) Sill covers, 109, are provided, each of which has a half-round bead, 110, at its upper edge, which fits within and is rigidly secured, for instance, by welding, to the corresponding half-round bead, 108, of the side panel. In the case of the front door opening, as shown in Fig. 16, the lower portion of the sill cover, 109, is secured, as by welding, to the pressed-in portion, 105, of the side panel, but, at other points, the sill cover, 109, is provided with a bottom flange, 111, which rests on and is secured, by welding or otherwise, to the body sill, 100, as shown in Fig. 18, thus providing a box girder construction beneath the thresholds of the doors.

A central door post forms a part of this side unit and comprises a channel member, 112, the side flanges, 113, of which have vertical shoulders, 114, pressed therein, forming stops for the free edges of the doors. This channel member is reinforced at the desired points by channel-shaped members, 115, secured between the side flanges, 113. These also form a channel for the reception of a wooden tacking strip, to be used in attaching the interior trimming to the body. This central door post is rigidly connected to the body sill, 100, by the reinforcing and connecting bracket, 116, which is channel-shaped and extends up between the flanges, 113, of the channel, 112, being rigidly secured thereto by welding or otherwise, as shown in Figs. 14 and 20$^A$. The lower portion of this bracket, 116, is bent laterally so as to provide a foot, 117, which rests upon and is secured to the body sill, 100, as shown in Figs. 20 and 20$^A$. This foot, 117, as well as the body sill, 100, is slotted, at 118, to provide for the body bolt holes. The side walls of this channel bracket, 116, at their ends, are bent laterally, forming the flanges, 119, which are riveted to the flange, 101, of the body sill, and the body portion of the bracket foot, 117, is bent upwardly forming the flange, 120, which is also riveted to the flange, 101, of the body sill.

At the upper end of this central door post, I have provided a top rail, 121, through which the side unit is connected to the roof unit and to the upper portions of the cowl and tonneau units. This top rail, 121, is of channel-shape and is provided with a longitudinally-extending shoulder, 122, formed in the base of the channel, which forms a stop for the upper edges of the doors. This top rail, 121, is secured to the door post, as shown in Figs. 21 and 21$^A$, and it will be seen that there are a pair of channel brackets or members rigidly secured, by welding or otherwise, within the channel, 112, of the door post and secured to the top rail. The channel bracket, 125, fits within the narrower portion of the channel, 112, of the door post, and is riveted at its upper end to the outer part of the top rail, while there is a wider bracket, 124, which fits between the flanges, 113, of the door post channel, 112, and is riveted, at 123, to the inner portion of the top rail, 121. The forward end of the top rail, 121, is to be connected to the flanges, 98 and 99, of the bracket, 81, as shown in Fig. 10.

The tonneau unit includes that portion of the body shell and the skeleton frame of the body located in the rear of the rear door openings. The tonneau unit may include a frame structure including the tonneau sill, the rear door posts and the supporting members for the rear seat, and a shell applied externally to this framework and consisting of a tonneau panel forming the sides and back of the rear seat. This panel may extend upwardly in position to be connected to the rear end of the roof but, inasmuch as this would require a stamping of considerable size, I prefer to employ a top rear panel secured to the upper rear edge of the tonneau panel and extending upwardly therefrom to the line of the roof. The tonneau unit may also include suitable supports for the side and rear windows. I prefer to provide the tonneau unit with projecting portions by which it may be readily connected to the side and roof units in the final assembly.

The tonneau unit for the sedan body is illustrated in Figs. 22 to 32, inclusive. The tonneau framework includes a tonneau sill structure comprising the rear cross member, 127, and the forwardly-projecting side members, 126, said sill being channel-shaped in cross section. The forward ends of the members, 126, of the tonneau sill, are connected by the channel cross-member, 128, which, in this case, is located in line with the lower forward corners of the tonneau unit. The tonneau panel, 129, is pressed into the desired curvature to form the sides and back of the rear seat, the side portions of said panel being pressed inwardly, at 130, to form the wheelhousings. The wheelhousings, 130, are also provided with inwardly pressed portions forming the shoulders or ledges, 131, to which the seat supports and heel-board may be connected. This feature of the tonneau construction is described and claimed in my pending application for steel bodies for automobiles, Serial No. 336,059, filed November 6, 1919. The lower edge portion of the tonneau panel, 129, has an inwardly-extending flange, 132, formed thereon, which extends beneath and is rigidly secured, by welding or otherwise, to the lower surfaces of the portions, 127 and 126, of the tonneau sill. Reinforcing brackets, 133, are secured to the tonneau panel at the lower, forward corners thereof. In this case, these reinforcing brackets are sheet metal stampings which are pressed inwardly, at 134, to conform to the shape of the wheelhousings, 130, and are applied and rigidly secured to the inner surface of the tonneau panel at the lower, forward corners thereof. Each reinforcing bracket, 133, has an inwardly-extending flange, 135, formed thereon, which conforms to the shape of the lower side portion of the rear door opening, and to which the tonneau panel and door post are secured, in the manner shortly to be described. An inwardly-extending flange, 137, is formed at the lower edge of the bracket, 133, and the rear portion of said flange lies in the space, 138, between the flange, 132, on the tonneau panel and the forward end of the portion, 126, of the tonneau sill, and beneath the end of the channel cross member, 128, see Fig. 24, while the forward portion thereof extends into and is secured to the sill member 100, of the side unit when the units are assembled. The reinforcing bracket, 133, extends forwardly, beyond the tonneau panel, such forwardly projecting portion being channel-shaped and including the side portion, 136, which conforms to the inclination and curvature of the side panel, 104, of the side unit, and the upper flange, 148, which conforms in inclination and curvature to the threshhold flange 107, of the side unit. The ends of the channel cross member, 128, are flattened out, forming the upwardly turned straps, 139, which are applied and rigidly secured to the brackets, 133.

A pressed-metal panel is secured in the tonneau unit so as to form the heel-board for the rear seat and a portion of the floor of the tonneau. This panel has the vertically-extending portion, 140, the ends of which are rigidly secured, by welding or otherwise, to the ledges or shoulders, 131, of the tonneau panel and which forms the heel-board for the rear seat. The upper portion of this panel is offset forwardly, forming the ledge or shoulder, 141, which serves as a support for the forward edge of the seat cushion and as a cushion retainer. The body portion, 142, of this panel, extends horizontally forward from the lower edge of the heel-board portion, 140, and forms a portion of the floor of the tonneau, the forward end of said portion resting on and being secured to the channel cross member, 128. The extreme forward portion of this panel, in front of the cross member, 128, is offset downwardly, forming the ledge, 143, which supports the rear ends of the floor boards. Angle members, 144, are secured, by welding or otherwise, to the horizontal portions of the ledges or shoulders, 131, formed in the tonneau panel, and these angle members serve as supports for the sides of the seat cushion, their forward ends being secured to the upper end portions of the heel-board, 140. The rear central portion of the tonneau panel is reinforced by the brace member, 145, which extends from the cross member, 127, of the tonneau frame to the upper edge of the tonneau panel, as shown in Fig. 2. An angle member, 145', extends transversely of the tonneau between the rear ends of the angle members, 144, and forms the rear support for the cushion for the rear seat. This construction is shown in Fig. 2.

The forward, side portions of the tonneau panel, 129, are flanged inwardly, at 146, the lower portions of this flange, 146, being applied externally and rigidly secured to the flange, 135, of the reinforcing bracket, 133, see Fig. 26. A reinforcing strip, 147, forming a part of the rear door post, is applied and rigidly secured to the exterior surface of the flange, 146, and extends upwardly from the flange, 148, of the reinforcing bracket to the top of the tonneau unit, being curved longitudinally to conform to the shape of the rear door opening. The rear, central portion of the tonneau panel, 129, is turned inwardly at its upper edge, forming the inwardly-extending flange, 149. The upper portion of the body shell of the tonneau unit is formed by the panel, 150, which is arched horizontally to form the rear upper portion of the body shell and the side portions thereof in the rear of the side windows, the upper portion of this upper panel being bent forwardly into line with the roof and provided with an offset flange, 150'. The lower edge of the panel, 150, is bent inwardly, forming the inwardly-extending flange, 151, by which it is rigidly secured to the upper edge of the tonneau panel, 129. In this particular situation, I secure these two panels together and reinforce the body at this point by interposing the web of a T-bar, 152, between the flanges, 149 and 151, as shown in Fig. 32. This T-bar is longitudinally curved to conform to the curvature of this portion of the body shell, as shown in Fig. 22. A reinforcing strap or bar, 153, is positioned on the upper surface of the flange, 151, and the bars, 153 and 152, and flanges, 151 and 149, are rigidly secured together by riveting or by any other suitable means. The panel, 150, is provided with a rear window opening, 154.

The forward, side portions of the panel, 150, have vertically-extending beads, 155, formed therein and, in front of these beads, the metal of the panel is bent inwardly, forming the inwardly-extending flanges, 156, to each of which a Z-shaped, vertically-extending bar is rigidly secured, by welding or otherwise, see Figs. 22 and 31. This bar has a portion, 158, applied and secured to the flange, 156, and an offset flange, 157, which forms a part of the run for the side window and to which a molding, 159, (shown in dotted lines in Fig. 31) may be detachably secured to hold the window in place. The flange, 157, of this bar, extends downwardly, below the lower edge of the window, to the top of the wheelhousing, 130, and a bracket, 160, is secured thereto to support the window in lowered position, (see Fig. 2). The upper side portions of the tonneau panel, 129, beneath the side windows, are provided with horizontally-extending beads, 160', forming, substantially, continuations of the T-bar, 152, and, above these beads, the panel is bent inwardly, forming the inwardly-extending flanges, 161, at the bottoms of the side window openings. An angle bar, 162, has its horizontal portion applied externally and rigidly secured to each flange, 161, (see Fig. 30). This angle bar has a downwardly-extending web, 163, which is inclined, with respect to the horizontal portion, 162, at an angle of less than 90 degrees. The inclined web, 163, is provided with a plurality of screw-threaded bosses, 164, into which the screws, 165, are threaded, retaining in position the plate 166, which holds a rubber weather-strip having a projecting upper edge, 167, which is adapted to wipe against the glass of the side window as it is lowered. This forms a seal preventing water from entering the inside of the body through the space provided for the window-glass. A top rail, 168, is provided, at each side of the tonneau unit, above the opening for the side window. The body portion of each rail is formed into a horizontally-extending bead and the upper portion of each rail, 168, is offset inwardly, forming a flange, 169, by which it may be connected to the roof unit. The lower edge of each top rail, 168, is bent inwardly, forming the inwardly-extending flange, 170 which is rigidly secured, for instance by welding, to the laterally-projecting flange, 171, of the channel, 172, which receives the top edge of the side window when it is in its raised position. The rear ends of the channel members, 172, are rigidly connected to the upper ends of the bars, 157, forming the guides or runs for the rear edges of the side windows. At the forward upper portions of the tonneau unit there are provided the cap members, 173, positioned at the forward edges of the side windows and each provided with the inturned flanges, 174 and 175. The flange, 175, is applied internally and rigidly secured, by welding or otherwise, to the strip, 147, forming part of the rear door post and the flange, 174, is applied internally and rigidly secured, as by welding, to a Z-bar, 176, which has an inner offset flange forming the guide or run for the forward edge of the side window and to which a molding, 177, (shown in dotted lines in Fig. 29), may be detachably secured to hold the window in place. This structure is reinforced by a plurality of Z-shaped brackets, 178, which are interposed between the strip, 147, and the Z-bar, 176, as shown in Fig. 29. It will be seen that this construction not only provides a guide for the forward edge of the side window, but also forms a very strong door post structure extending down about to the upper end of the reinforcing bracket, 133, as shown in Fig. 2. This bar, 176, also carries a bracket, 160, serving as a stop for the lower edge of the lowered window. It will be understood that the cap member, 173, does not extend below the upper edge of the tonneau panel, 129, and that the flange of the bar, 176, which is secured to said cap member, may be omitted below the upper edge of the tonneau panel, 129. A bracket, 179, is secured to the inner face of the door post structure and to the strip, 147, thereof, as shown in Fig. 27, and provides a device for detachably supporting the pin for the upper hinge of the rear door. Angle brackets, 180 and 181, are secured to the upper end of the strip, 147, these brackets being offset laterally and vertically from each other so as to correspond to the formation of the top rail, 121, of the side unit, to which they are to be attached.

The roof unit may comprise one or more roof panels which are shaped to form the roof of the body and are secured to a drip trough running around the edges thereof. These panels are reinforced in such a manner as to form a self-sustaining unit which may be secured to and supported by the various other units of the body. In this particular embodiment of my invention, the roof unit is illustrated in Figs. 33 to 38 and is made up of a pair of similar sheet metal panels, 182, which are secured together along the central line of the roof by means of a seam-joint, 183, see Fig. 36. These panels are stiffened by a plurality of longitudinally-extending ribs, 184, struck up therein. The rear portions of the roof panels are offset downwardly, forming the rearwardly-extending flange, 185, which engages and is secured to the offset flange, 150', at the top of the top rear panel, 150. At the sides and forward end, the roof panels are bent downwardly and thence laterally, forming the laterally-extending flange, 186, which is received within the channel, 187, and secured thereto. This channel, 187, is continuous along the sides and front of the roof unit and forms a drip trough for conducting the water draining from the roof to the rear end of the body. At the sides of the roof unit, the channel, 187, is provided with an inwardly-extending flange, 188, to which the cross braces of the roof unit are secured. These cross braces comprise the transversely-extending angle bars, 189, which are arched to conform to the shape of the roof unit and are secured to the panels, 182, thereof. The ends of these cross braces, 189, are flattened out, at 190, and riveted, as at 191, to the flanges, 188, of the channels, 187.

The several body units which I have described above, are so constructed that very few and relatively simple operations are necessary to connect them in the final assembly to form the complete body. The body sills, 100, projecting from the forward ends of the side units, as shown in Fig. 13, are inserted into the spaces beneath the portions, 56, of the brackets, 54, at the lower rear corners of the cowl unit, until the forward ends of the side panels, 104, are in engagement with the rear edges of the cowl panel, 45. The side units are connected to the cowl units by riveting the horizontal portions, 56, of the brackets, 54, to the horizontal portions, 100, of the body sills and the vertical flanges, 55, of the brackets to the vertical flanges, 101, of the body sills. The inturned flanges, 49, at the lower edges of the cowl panel are also welded to the forward ends of the body sills, 100. The portions, 98 and 99, of the brackets at the upper corners of the cowl unit, lie in the offset base portions of the channels, 121, of the top rails of the side units, as indicated in dotted lines in Fig. 10, and these parts are secured together by riveting or in any other suitable manner. It will be apparent that this provides a very strong connection between the cowl unit and the side units and one which can be made very quickly and readily. After the cowl units and side units have been connected together as described, the triangular stampings, 192, forming the toe-board supports, are placed within the cowl unit at the sides thereof and welded to the forward ends of the body sills and to the shroud pan, 47. The tonneau unit is connected to the rear ends of the side units by inserting the channel-shaped projecting portions of the reinforcing brackets, 133, within the hollow girders formed by the side panels and the sill covers, 109, as shown in Figs. 18 and 18A. The portion, 136, of the reinforcing bracket, 133, engages the inner surface of the side panel, 104, while the inclined flange, 148, of said reinforcing bracket, engages the inner surface of the inclined threshold flange, 107, of the side panel. Near the rear end of each side unit, the body sill, 100, is offset from the lower flange, 106, of the side panel, so as to provide a space within which the flange, 137, of the reinforcing bracket, 133, may lie. The side unit is connected to the tonneau unit by riveting the flanges, 137, of the reinforcing brackets to the horizontal portions, 100, of the body sills, as shown in Fig. 18A. The forwardly-extending brackets, 180 and 181, at the upper ends of the rear door posts of the tonneau unit, lie within and are riveted to the offset bases of the top rail channels, 121, of the side units. This results in a very strong and rigid connection between the side and tonneau units, and one which can be made very simply and quickly. It will be seen that, when the cowl, tonneau and side units are connected together, the body is complete except for the roof, and that these units, when connected, provide a support for the roof unit. The roof unit is positioned upon the upper ends of these connected units with the flange, 185, at the rear end of the roof unit, resting upon the offset flange, 150', at the upper edge of the top rear panel. These offset flanges, together, form a sort of curved channel at the rear of the roof in which a filler strip, 193, is positioned, all of these parts being rigidly connected by welding, or in any other suitable manner. The channel, 187, at the sides of the roof unit, lies on the outside of the top rail channels, 121, of the side units, the roof being supported, in part, by the engagement of the flanges, 188, with the outer edges of the top rails, 121. The forward portion of the channel, 187, of the roof unit lies outside of the flange, 98', of the peak panel, 96, and the roof unit is secured together by welding the inner flange of the channel, 187, to the outer flanges of the top rails, 121, of the side units, and to the flange, 98', of the peak panel, respectively.

In manufacturing closed automobile bodies in accordance with my invention and the method which I have described for producing such bodies, the several units going to make up the body are manufactured independently and the complete body is formed by connecting together these several units in the manner described. Briefly stated, my improved method consists in making cowl units, including a cowl panel and front door posts, side units, including the body sill and side panels and the central door posts, tonneau units, including the rear portion of the body shell, a suitable framework therefor, and rear door posts, and a roof unit, including a panel to form the roof of the body, and in rigidly connecting the forward ends of the side units to the cowl unit and the rear ends of the side units to the forward portions of the tonneau unit and in connecting the roof unit to the cowl, tonneau and side units, so as to form a complete and rigid automobile body of the "closed" type.

It is to be noted that all wood is eliminated in the construction of this body. This has very decided advantages inasmuch as the parts going to make up the various units are practically all sheet metal stampings, which can be produced in large quantities very rapidly and cheaply and with great uniformity. The elimination of all wood from the construction of this "closed" body has the further advantage that the body may be subjected to a baking temperature, after it is completed, in order to bake an enamel thereon. This gives a body finish which is more durable and far better than the body finish which it is possible to obtain on a body of composite construction, in which the presence of wood in the framework prevents the application of a baking temperature. When I refer to the elimination of wood from the body construction, I wish it to be understood that I mean that there is no wood used in the framework of the body. It is customary, in connection with these bodies, to use wooden tacking strips to which the upholstery or interior trimming is tacked. Such wooden tacking strips do not form a part of the body proper and are applied after it is finished. In this connection it is to be noted that the channel brackets, 115, of the central door post, and the channel formed in the rear door post, between the strip, 147, and the Z-shaped brackets, 178, provided for the attachment of such tacking strips at those points. The channel-shaped top rails, 121, are also fitted to receive such tacking strips and a tacking strip may also be positioned in the channel formed between the flange, 94, and the peak panel, 96, as shown in Fig. 8. These wooden tacking strips may be applied at various other points, as will be readily apparent.

I am aware that the sedan body, which I have described in this application in order to explain and as constituting one embodiment of my invention, may be altered considerably without departing from the spirit and essence of my invention, and, therefore, I claim my invention broadly, as indicated by the appended claims.

Having thus described my invention, what I claim as new and useful and desire to secure by Letters Patent is:

1. A unitary cowl sub-assembly for closed automobile bodies, comprising cowl paneling and a post extending to the top of the body, said sub-assembly being formed along its lower side edge with an angular formation providing a seat to nest with and form longitudinally extending final assembly joints with the projecting fore end of a body side sill and formations on the post at both top and bottom to receive a complemental part of an adjoining body portion.

2. In a pressed metal body construction, a cowl unit assembly including a cowl panel, a door post secured at a rear vertical edge of said panel and a bracket having a portion secured to said door post at the bottom thereof, said bracket being provided with a laterally extending portion spaced above the bottom edge of the cowl panel and adapted in final assembly to be secured to a body side sill.

3. In an automobile body, an independently assembled cowl unit comprising a cowl panel, door posts rigidly secured to rear edge portions of said cowl panel and extending in one piece vertically above the upper edge thereof, a peak panel, and brackets secured to said peak panel and to the upper ends of said door posts, said brackets being provided with rearwardly extending portions adapted to connect the upper portion of said cowl unit to other body units.

4. In an automobile body, the combination of a cowl panel having inwardly-extending flanges at its lower side edges, door posts secured to rear edge portions of said cowl panel, bracket members secured to the lower ends of said door posts and provided with horizontal portions spaced vertically from said flanges, and body sills inserted between said flanges and the horizontal portions of said brackets and rigidly secured thereto.

5. A pressed metal vehicle body construction comprising a cowl unit embodying a front door post the bottom of which door post is elevated above the plane of the bottom of the cowl unit, a body side sill intervened between the bottom of the post and the bottom of the cowl unit, and a bracket having a trunk anchored in the body of the post and a base anchored to the upper side of the body side sill therebeneath.

6. In an automobile body an independently assembled cowl unit embodying a pair of door posts extending vertically above said cowl unit, a peak panel interconnecting the tops of said door posts, a belt panel interconnecting the intermediate portions of said door posts, and final assembly unit joint formations formed at the bases and tops of said door posts adapted for telescopic engagement with the projecting fore ends of the next adjoining portion of the body.

7. In an automobile body an independently assembled cowl unit embodying a pair of door posts extending vertically above the upper edge of the unit, a lower cross bar connecting said door posts at said upper edge of the cowl unit, an upper cross bar connecting the upper ends of said door posts, said door posts and cross bars forming a frame adapted to receive a windshield, and brackets secured to the upper ends of said door posts and to said upper cross bar each of said brackets being provided with a mounting for said windshield.

8. A unitary cowl sub-assembly adapted to enter a sectional automobile body structure comprising a cowl body panel having inwardly extending horizontal flanges at the lower edges of said panel, said panel terminating at its rear end in inwardly extending vertical flanges, and door posts secured to said vertical flanges with the lower ends thereof spaced from said horizontal flanges whereby to effect a way for the reception of the forwardly extending portions of the next adjoining unit, the upper ends of said door posts projecting vertically above the belt line of the body structure, and adapted for making final assembly joints with top rails of the next adjoining unit.

9. An automobile body comprising an independently assembled endmost unit adapted to be joined to a next adjoining unit in longitudinal series therewith, vertically extending members embodied in said endmost unit and extending to the top of the automobile body, brackets secured to the tops and bases of said vertically extending members, said brackets being provided with horizontally projecting portions through which final assembly unit joints are made with top rails and sills of the next adjoining unit.

10. In an automobile body, an independently assembled side unit including a longitudinally extending side sill structure, a vertically extending door post secured thereto intermediate its ends, a top rail rigidly secured to the upper ends of said door post, said sill and top rail being provided with final assembly joint formations at their ends complemental to similar formations on adjoining units through the engagement of which the units are joined together in final assembly, at least one of said sill and top rail being extended at one side of said post through substantially the width of a door opening and on the other side of said post substantially to the end of the body.

11. A unitary side sub-assembly for closed automobile bodies constructed overall of substantially flat form and comprehending longitudinally extending side sill and top rail members and vertically extending interconnecting means between said members.

12. An independently assembled pressed metal side unit for closed body vehicles embodying a door post, and front and rear door portions of the door sills and top rails in assembled relation thereto and substantially of the extent of the full width of the door.

13. An independently assembled side frame unit adapted to enter the unit assembly construction of a completed closed vehicle body comprising a door post of substantially the full height of the completed body, a connected bottom sill and top rail of a length substantially equal to the width of the door and adapted at their ends to complementally engage an adjoining unit of a completed body in a plane substantially vertical.

14. An independently assembled side frame unit adapted to enter a unit assembly construction for closed body vehicles comprising a door post of a height substantially equal to the height of the completed body, a bottom sill and a top rail each extending in opposite directions from the bottom and top ends of said door post, forming with the door post front and rear door frames and of an extent on either side of said door post substantially equal to the full width of the door, which said bottom sill and top rail are adapted at their extremities to complementally engage units of the completed body in advance thereof and to the rear of said side unit in substantially vertical planes.

15. In an automobile body an independently assembled side unit including a longitudinally extending body sill, a vertically extending door post secured thereto and a top rail rigidly secured to the upper end of said door post, the forward and rear ends of said body sill and top rail being provided with joint formations complemental to similar formations formed on the next adjoining unit through the engagement of which the units are joined together.

16. In an automobile body, an independently assembled side unit including a longitudinally extending body sill and a vertically extending door post connected thereto intermediate the ends thereof, said door post being of channeled cross section with the base extending vertically above the walls thereof, a top rail having portions resting on the upper ends of said base and the side walls of the door post, and a pair of channel brackets each secured to a portion of said rail and to the door post within the channel at the upper ends thereof.

17. In an automobile body, an independently assembled side unit including a longitudinally extending body sill, a vertically extending door post connected to said sills centrally thereof, said door post being of channel cross section and having vertical shoulders pressed therein to form stops for the free edges of the doors, a top rail mounted on the upper end of said door post and a pair of brackets secured to said rail and to the door post within the channel at the upper end thereof.

18. In an automobile body, a tonneau unit including a tonneau frame, a tonneau panel curved to form the lower, rear portion of the body shell and applied externally and rigidly secured to said tonneau frame, a top rear panel mounted on the rear upper edge of said tonneau panel and curved to form the rear upper portion of the body shell, door posts secured to forward edge portions of the tonneau panel and extending vertically above the upper forward corners thereof, top rails secured, at their ends, to said door posts and said top rear panel, respectively, and members secured to said top rails and adapted to receive the upper edges of side windows.

19. In an automobile body, a roof unit including a panel curved to form the roof of the body and a marginal channel secured to the side and forward edges of said panel, the portions of said channel at the sides of said panel being provided with inwardly-extending flanges.

20. In an automobile body, a roof unit including a panel curved to form the roof of the body, a marginal channel secured to the side and forward edges of said panel and arched braces extending transversely of said panel and having their ends secured to said channel.

21. A closed automobile body structure comprising independently assembled cowl and rear units and means interconnecting said units, and an independently assembled roof unit rigidly secured to and supported by said cowl and rear units and including a roof panel curved to form the roof of the body, a marginal channel member rigidly secured to the side and forward edges of said panel and a plurality of bracing ribs extending transversely of said roof panel the ends of said ribs being connected to said marginal channel member.

22. A unit assembly construction for automobile bodies comprising side structures terminating in a top rail provided with a ridge to receive the roof, and an independently assembled roof unit provided with a base flange straddling said ridge.

23. A pressed metal unit construction for automobile bodies comprising a body side structure embodying a top rail, and an independently assembled pressed metal roof unit therefor having an arched cross section in its main body provided on its margins exteriorly with a perimetral drain channel overlapping the top rail of said structure, and interiorly with perimetral shoulders overlying the top rail.

24. A unitary assembly construction for automobile bodies comprising an endmost unitary sub-assembly terminating substantially in the vertical plane of the endmost door posts and embodying endmost door posts extending to the top of the body, and an adjoining unit joined thereto in said plane through complemental joint parts including the top and base of one of said door posts.

25. A unit assembly construction for closed body automobiles comprising a cowl unit embodying in sub-assembly a cowl panel, and front door posts extending from the base of the panel upwardly on each side thereof, and an independently assembled adjoining unit embodying a door sill member, a body post, and a top rail connected together in sub-assembly, and connected to said cowl unit in final assembly by both sill and top rail joints lying substantially in the transverse plane of and including the door posts of the cowl unit.

26. In a pressed metal vehicle body comprising a cowl unit having hollow front door posts, a side frame unit embodying a longitudinally-extending threshold member, and a member rigidly joined to the front end of said threshold member nested within and rigidly joined to a front door post of the cowl unit.

27. A pressed metal automobile body comprising a cowl unit having hollow door posts, and pressed metal side units embodying longitudinally-extending threshold portions terminating at the ends at said posts and rigidly connected to upstanding members telescoped in the hollow of said posts.

28. A pressed metal vehicle body comprising a cowl unit embodying hollow front door posts extended above the body of the cowl unit to encompass a windshield opening, an adjoining unit embodying longitudinally extending threshold members, and similarly extending top rails connected with each other independently of the posts aforesaid but terminating at the bottom and top of the posts, respectively, together with means telescoped in the hollow of said door posts and rigidly connected with terminal ends of said threshold and top rail members, and through which connection of the adjoining unit with the cowl unit is made.

29. A pressed metal vehicle body comprising a cowl unit having hollow door posts, an adjoining unit having hollow top rail and hollow threshold members terminating at said door posts, and means rigidly connected with one of said units interfitting within the hollow portion of the other of said units, whereby said units are connected together.

30. A unit assembly construction for pressed metal vehicle bodies comprising a completely assembled cowl unit embodying front door posts extending vertically to the roof of the vehicle, and a second completely assembled unit adapted to form a portion of the body in the rear of the cowl unit and embodying front door sill and top rail sections, the sill sections terminating forwardly of the transverse plane of the door posts and the top rail sections terminating substantially in said plane, said cowl unit, door sills and top rails being provided with complemental engaging portions substantially in said transverse plane through the engagement of which the units are joined together.

31. A unit assembly construction for pressed metal vehicle bodies comprising an independently assembled cowl unit having a longitudinally extending way in its lower marginal portion extending from its fore end to its rear end and embodying a door post extending vertically to the top of the body, and an independently assembled adjoining unit embodying a top rail adapted to be joined to the upper end of said door post and a body side sill having a threshold portion adapted to be joined to said cowl unit at the mouth of said way, said side sill having a portion extending forwardly from said threshold portion adapted to be entered in said way and projected into contact with and connected to the fore end of said cowl unit.

32. A unit assembly construction for pressed metal vehicle bodies comprising a tonneau unit embodying tonneau side sills and rear door posts interconnected by a bracket having an inturned base flange, and an independently assembled body side unit embodying a main body side sill constituting a threshold for a door opening the rear edge of which is defined by one of said posts, the forward portion of said base flange of the bracket underlying the terminal end of said body side sill and through which the units are joined.

33. A unit assembly automobile body structure comprising an independently assembled tonneau unit embodying a rear door post, and a bracket at its lower forward corner to which the post is joined, and an independently assembled body unit in advance of said tonneau unit embodying a door sill member, and a top rail substantially coextensive with said sill member, said sill member and top rail having joint formations complemental to similar formations at the base and top of said door posts including said bracket whereby said units are joined together substantially in the transverse plane of said door posts.

34. A unit assembly construction for automobile bodies comprising a tonneau unit having longitudinally extending side sills and rear door posts interconnected by a bracket having an integral fore extension, said door post extending vertically above the belt line of said tonneau unit, together with a pair of independently assembled adjoining units each of which includes a rear threshold section of hollow form within which is adapted to be telescoped said integral fore extension and a top rail coextensive with said threshold section adapted to be joined to the upper ends of said door posts whereby said units are joined together in final assembly.

35. A unitary assembly construction for closed automobile bodies comprising a side unit overall of substantially flat form and comprehending longitudinally extending interconnected side sill and top rail members having their ends formed with final assembly joint formations, a front unit comprising a cowl and connected windshield frame adapted to make final assembly joints with the side unit substantially in the plane of the windshield frame and a rearmost unit vertically interconnecting the rear ends of the side units.

36. A unit assembly automobile body construction for closed body automobiles comprising a cowl unit embodying in subassembly a front door post extending to the top of the body, an independently assembled tonneau unit also embodying in subassembly a door post extending to the top of the body, and an intervening independently assembled side unit in general of I-form comprising in subassembly a sill member, a body post erected thereon, and a top rail, which several units are interconnected through the intermediary of the sill member and the top rail by means of final assembly joints which are broken, respectively, substantially in the transverse planes of the posts of the cowl and tonneau units.

37. An automobile body comprising an independently assembled cowl unit embodying a pair of front door posts extending vertically above the belt line of the body, an independently assembled tonneau unit embodying a pair of rear door posts extending vertically above the belt line of the body, and a pair of independently assembled side units disposed intermediately of said cowl and tonneau units and provided with joint formations at their forward and rear ends for engagement with complemental formations at the bases and tops of said front and rear door posts.

38. A unit assembly construction for vehicle bodies comprising an independently assembled cowl unit embodying a front door post and having its lower side edge formed to provide a way extending forwardly of said post, an independently assembled tonneau unit embodying a rear door post, and a bracket connected therewith and having a horizontally extending portion and an independently assembled side unit making final assembly unit joints with said cowl and tonneau units substantially in a transverse plane of said front and rear door posts at the bases and tops of said posts, respectively, said side unit embodying a body side sill provided forwardly and rearwardly with telescoping joint formations through which and the coacting ways and brackets of the cowl and tonneau, respectively, said final assembly unit joints are effected at the bases of the posts, and embodying further a top rail making final assembly joints with complemental formations at the tops of the posts.

39. A pressed metal unit construction for closed body automobile bodies comprising door posts of hollow cross section, top rails of angle cross section, and angle brackets having arms anchored within the hollow of the upper end of said body posts and provided with horizontal extensions nested within the angles of said top rails.

40. In an automobile body, a pressed metal body post, a pressed metal top rail, and an angle bracket anchored in said body post and having a horizontally-extending branch joined to said top rail, which angle bracket is provided with a portion anchored within said post and with a main body adapted to support a windshield structure.

41. In a pressed metal automobile body, hollow body posts, and angle shaped top rails extending in different directions from the tops of said body posts, and an angle bracket having its trunk anchored within the hollow of the top end of one of said posts and provided with branches respectively overlapping and secured to said top rails extending at different directions.

42. A pressed metal vehicle body construction comprising a pressed metal body post of hollow cross section, a top rail of stepped cross section joined on the top thereof, and a reinforcing bracket for said joint having a trunk anchored in the top of said hollow post and laterally-extending portions at different levels overlapped upon the respective steps of the angle section of said top rail and secured respectively thereto.

43. A pressed metal body construction embodying a hollow body post, a top rail of stepped cross section connected to the upper end thereof, and reinforcing bracket means for said juncture having a portion anchored in the hollow of the body of said post and portions, respectively, engaging the steps of said top rail.

44. A pressed metal vehicle body comprising a body post and a top rail connected therewith of compound angle section, and a reinforcing bracket having a trunk connected with the interior of said post and a branch interposed between the elements of said compound section of the top rail.

45. In an automobile body, a longitudinally extending body sill, a vertically extending door post connected to said sill centrally thereof, said door post being of substantially channel cross section, a top rail mounted on the upper end of said door post and a bracket member secured to said rail and to the door post within the channel at the upper end thereof.

46. In an automobile body, the combination of a frame including a pair of channel-shaped, metal side sills, one at each side of the body, brackets secured to said sills within the channels thereof, door posts rigidly secured to said brackets, and a plurality of sheet metal body panels secured to said frame.

47. The combination of a channel frame for the body of an automobile, or other vehicle, in which the channel is uppermost; a bracket member located in the channel; and a post carried by the bracket member.

48. The combination of a sill for the body of an automobile, or other vehicle, said sill being formed of a channel member, the channel being uppermost; and a series of bracket members secured in the channel at spaced distances apart.

49. The combination of a sill for the body of an automobile, or other vehicle, said sill consisting of a channel member; a channel shaped bracket located in the channel of the sill and secured to the side member of said channel; and a post fitting the bracket member and secured thereto.

50. In vehicle body construction, in combination, a channel frame in which the channel is uppermost, a channel-shaped bracket located in the channel, a post carried by the bracket, and sheet metal facing secured to said channel frame.

51. In vehicle body construction, in combination, a sill formed of a channel member with the channel uppermost, a bracket located in the channel, a post carried by the bracket, and sheet metal facing secured to said post and lapped under and secured to said sill.

52. A pressed metal vehicle construction comprising a hollow body post and a hollow body side sill joined thereto together with an angle bracket having a trunk anchored in a hollow of the post and a branch anchored within the hollow of said body side sill.

53. A pressed metal automobile body construction comprising a hollow body post and a connecting hollow body side sill together with an angle bracket having a trunk fitted within and anchored to the hollow of said post and a branch fitted within and anchored to the body of said side sill.

54. A pressed metal body construction embodying a door post, a body side sill connected therewith and having its adjoining end flared and constituting the threshold of the door, together with a bracket anchored in the said body post and having its end tapered to the flare of said body sill and whereby it may be telescoped snugly thereinto.

55. In an automobile body, the combination of a sheet metal side panel provided with an inturned flange at its upper edge forming a door threshold and terminating in a bead, and a sheet metal strip secured to said flange, at the bead, and forming, with said side panel, a box girder beneath the threshold of the door.

56. In an automobile body, the combination of a sheet metal panel provided with an inturned flage at its upper edge, forming a door threshold and terminating in a bead, and a sheet metal strip having a beaded upper edge, fitting within the bead of said flange and secured thereto, and forming, with said side panel, a box girder beneath the threshold of the door.

57. In an automobile body, the combination of a body sill. a side panel applied externally and rigidly secured thereto and having an inwardly-extending flange at its upper edge, forming a door threshold, said flange terminating in a bead forming a stop for the door, a sill cover having its upper edge secured to said flange, at the bead, and its lower portion secured to the body sill and forming, with the side panel, a box girder beneath the threshold of the door.

58. In an automobile body, the combination of a body sill extending longitudinally of the body, a side panel applied externally and rigidly secured to said body sill, and provided with an inturned flange at a door opening, and a member cooperating with said sill and side panel to form a box girder threshold beneath the door opening.

59. In an automobile body, a longitudinally extending sill and a threshold section overlapping the outside of said sill and secured thereto, said threshold section comprising a sheet metal outer panel having an inturned flange at the door opening and an inner sheet metal member secured to said flange and forming with said outer panel a box girder construction.

60. In an automobile body, a sheet metal side panel having an inturned flange at the door opening therein, said flange having a bead formed therein to constitute a door stop, and means connected to said inturned flange to form therewith a box girder beneath the threshold.

61. In an automobile body, a sheet metal side panel having an inturned flange at the door opening therein, said flange having a bead formed therein to constitute a door stop.

62. In an automobile body, the combination of a sheet metal cowl panel, a pair of door posts secured to rear edge portions of said cowl panel, a horizontal angle bar connecting said door posts at the rear upper edge of said cowl panel, the latter portion of said panel being applied and secured to said angle bar, and an instrument board supporting panel having its upper edge portion flanged over and secured to a vertical web of said angle bar.

63. A pressed metal vehicle body, a cowl panel and front posts projecting vertically thereabove and defining a windshield opening between them, which front posts are of hollow cross section and are flanged first transversely and then in the plane of the windshield opening whereby to form an angular rabbet to receive the windshield.

64. In a pressed metal vehicle body construction, a cowl panel and an interior finish panel having an upstanding beaded connection with each other at their top edges adapted to constitute a lower windshield stop.

65. In an automobile body, the combination of a panel having a window opening therein, and a flexible weather strip carried by said panel at the lower side of said opening and adapted to engage the window pane when the window is lowered.

66. In an automobile body, the combination of a tonneau panel curved to form the rear portion of the body shell, metal frame members secured to the upper edges of the side portions of said panel, and forming bottom sills for the side windows and a flexible weather-strip carried by each frame member and adapted to engage the window panes when the windows are lowered.

67. In an automobile body, the combination of a tonneau panel curved to form the rear portion of the body shell, angle members having horizontal webs secured to the upper edges of the side portions of said panel and vertical webs extending downwardly from said horizontal webs, at acute angles thereto, and a flexible weather strip carried by each of said vertical webs.

In testimony whereof, I affix my signature.

JOSEPH LEDWINKA.